(12) United States Patent
Lee et al.

(10) Patent No.: US 11,283,978 B1
(45) Date of Patent: Mar. 22, 2022

(54) ALIGNING LENS ELEMENTS IN A LENS MODULE RELATIVE TO AN IMAGE SENSOR

(71) Applicant: ASM Technology Singapore Pte Ltd, Singapore (SG)

(72) Inventors: Man Yip Lee, Hong Kong (HK); Fan Leuk Lai, Hong Kong (HK); Po Lam Au, Hong Kong (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 0 days.

(21) Appl. No.: 17/070,984

(22) Filed: Oct. 15, 2020

(51) Int. Cl.
*H04N 5/225* (2006.01)
*G02B 7/00* (2021.01)
*G02B 27/62* (2006.01)
*H04N 17/00* (2006.01)

(52) U.S. Cl.
CPC ........... *H04N 5/2254* (2013.01); *G02B 7/005* (2013.01); *G02B 27/62* (2013.01); *H04N 17/002* (2013.01)

(58) Field of Classification Search
None
See application file for complete search history.

(56) References Cited

U.S. PATENT DOCUMENTS

| | | | | |
|---|---|---|---|---|
| 9,641,733 | B1* | 5/2017 | Topliss | H04N 5/2253 |
| 10,187,636 | B2* | 1/2019 | Wong | H04N 5/2354 |
| 2006/0119800 | A1* | 6/2006 | Burnett | G03B 21/10 353/69 |
| 2010/0264949 | A1* | 10/2010 | Hobbs | G01R 31/2891 324/750.05 |
| 2013/0047396 | A1* | 2/2013 | Au | B23Q 17/22 29/407.09 |
| 2013/0162983 | A1* | 6/2013 | Tan | G01M 11/0292 356/124 |
| 2014/0364691 | A1* | 12/2014 | Krivopisk | A61B 1/05 600/109 |
| 2015/0042870 | A1* | 2/2015 | Chan | G02B 7/102 348/357 |
| 2015/0286033 | A1* | 10/2015 | Osborne | G02B 17/0852 348/345 |
| 2015/0288865 | A1* | 10/2015 | Osborne | G03B 13/36 348/218.1 |
| 2016/0274350 | A1* | 9/2016 | Aizenfeld | H04N 5/2254 |
| 2017/0187962 | A1* | 6/2017 | Lee | H04N 5/23287 |
| 2017/0201744 | A1* | 7/2017 | Wong | H04N 5/2257 |

(Continued)

*Primary Examiner* — John W Miller
*Assistant Examiner* — Sean N. Haiem
(74) *Attorney, Agent, or Firm* — Ostrolenk Faber LLP (57) ABSTRACT

Before fixing first and second lens modules to an image sensor to form an assembled camera module, the first lens module is held while electrical signals are provided to a first lens element comprised in the first lens module to drive the first lens element to move. An incident light is received along a first optical path and a reflective surface of the first lens element projects the incident light along a second optical path perpendicular to the first optical path such that the incident light is projected through the second lens module along the second optical path onto the image sensor. The first lens module and first lens element are moved relative to the image sensor until the reflective surface forms an inclination angle of 45 degrees with respect to the incident light, so that the incident light is projected normally onto an image plane of the image sensor.

20 Claims, 8 Drawing Sheets

(56) References Cited

U.S. PATENT DOCUMENTS

| | | | |
|---|---|---|---|
| 2018/0180859 A1* | 6/2018 | Sugita | G02B 15/145523 |
| 2018/0252893 A1* | 9/2018 | Park | G03B 3/10 |
| 2019/0227199 A1* | 7/2019 | Kao | G02B 7/023 |
| 2019/0231220 A1* | 8/2019 | Refai | G06T 7/557 |
| 2020/0404181 A1* | 12/2020 | Lee | G02B 7/182 |

* cited by examiner

ALIGNING LENS ELEMENTS IN A LENS MODULE RELATIVE TO AN IMAGE SENSOR

FIELD OF THE INVENTION

The invention relates to a method for aligning lens elements in a lens module relative to an image sensor, and in particular, to the alignment of elements of a lens module relative to one another prior to finally fixing the lens module to the image sensor.

BACKGROUND

Imaging modules are commonly used in portable consumer devices such as mobile phones, tablets and notebook computers to provide imaging capabilities. Due to the improvement of technology, higher-quality imaging modules are being used in these mobile devices. Therefore, the alignment between a lens module and an image sensor in such an imaging module becomes very important for achieving better image quality during image capturing.

During the assembly of an imaging module, such as that found in a camera for portable consumer devices, it is necessary to align a focusing lens of the lens module and the image sensor in order to achieve the best image quality. Conventionally, the alignment process involves an apparatus which has made particular assumptions about the orientation of the optical path and the arrangement of the image sensor. Such an apparatus may be unsuitable for aligning some imaging modules.

So-called "folded cameras" are getting more popular, especially in mobile phones. A "folded camera" arrangement comprises a lens module and an image sensor which need to be optically aligned. An advantage of these folded camera modules is that it can use a telecentric lens or tele-lens with a longer focal length to support optical zoom capability of up to 10× despite the limited thickness of compact devices. The camera module may typically comprise an optical image stabilizer ("OIS") module (which may further comprise an adjustable prism therein), the tele-lens and the image sensor. Due to its complex optical path structure and OIS system, it is not possible to perform an active alignment ("AA") process on this kind of folded camera using a conventional alignment apparatus.

An attachment or integration of parts of a lens module with respect to an image sensor is commonly performed using a passive bonding process without prior alignment, and when aligning the OIS module with respect to the image sensor, variations in the camera's lens module are sometimes excessively out of specification. Thus, it may not be possible to ensure that a viewing direction of the assembled camera module is correctly directed at a target direction when an OIS lens element (such as a prism) is initialized and moved to its home position. In this case, since the OIS lens element inside the folded camera module has only a limited tilting correction motor travel range, it may not be possible to fully compensate an initial tilting error between the OIS module and the image sensor if the initial tilting error is too large, after the OIS module has already been attached to or integrated with the tele-lens.

It would be beneficial to be able to use an existing AA system together with an additional detection or inspection device to aid in the correction of this initial tilting error of the OIS module, to avoid yield loss due to an inability to align its OIS lens element with its image sensor. This can help to avoid any production shortcomings in the OIS module, and thus provide a better production yield in the final folded camera module that is assembled.

SUMMARY OF THE INVENTION

It is thus an object of this invention to seek to provide a method for aligning lens elements in a camera module which provides an improved production yield in a camera module assembly process that includes an OIS module.

Accordingly, the invention provides a method for aligning first and second lens modules relative to an image sensor before fixing the first and second lens modules to the image sensor to form an assembled camera module, the method comprising the steps of: holding the first lens module while providing electrical signals to a motorized first lens element comprised in the first lens module, the electrical signals being operative to drive the first lens element to move; receiving an incident light along a first optical path with a reflective surface of the first lens element and projecting the incident light along a second optical path perpendicular to the first optical path; projecting the incident light through the second lens module along the second optical path onto the image sensor; and moving the first lens module and first lens element relative to the image sensor until the reflective surface forms an inclination angle of 45 degrees with respect to the incident light, so that the incident light is projected normally onto an image plane of the image sensor.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION OF THE PREFERRED EMBODIMENTS OF THE INVENTION

Figure 1:
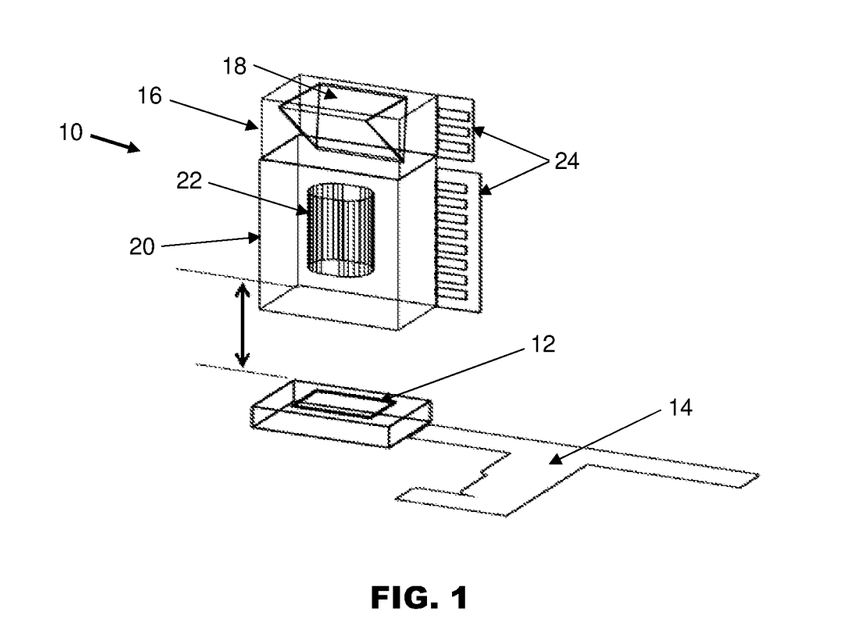
FIG. 1 is an isometric view of a first mode of assembling a camera module where an OIS module has been integrated with a tele-lens module to form a combined lens module prior to attaching the combined lens module to an image sensor.

FIG. 1 is an isometric view of a first mode of assembling a camera module where a first lens module, which may be in the form of an OIS module 16, has been integrated with a second lens module, which may be in the form of a tele-lens module 20, by way of a passive bonding process to form a combined lens module 10, prior to attaching the combined lens module 10 to an image sensor 12 to form an assembled camera module. The image sensor 12 is mounted on a flexible printed circuit board 14. The OIS module 16 includes a motorized OIS lens element 18 (which may typically be in the form of a prism) and the tele-lens module 20 includes a motorized tele-lens element 22. A pogo pin connector 24 integrated to a lens holder module is electrically connected to the combined lens module 10 in order to supply electrical signals to both the motorized OIS lens element 18 and the motorized tele-lens element 22 of the OIS module 16 and the tele-lens module 20 respectively, to facilitate alignment of the combined lens module 10 to the image sensor 12.

Figure 2:
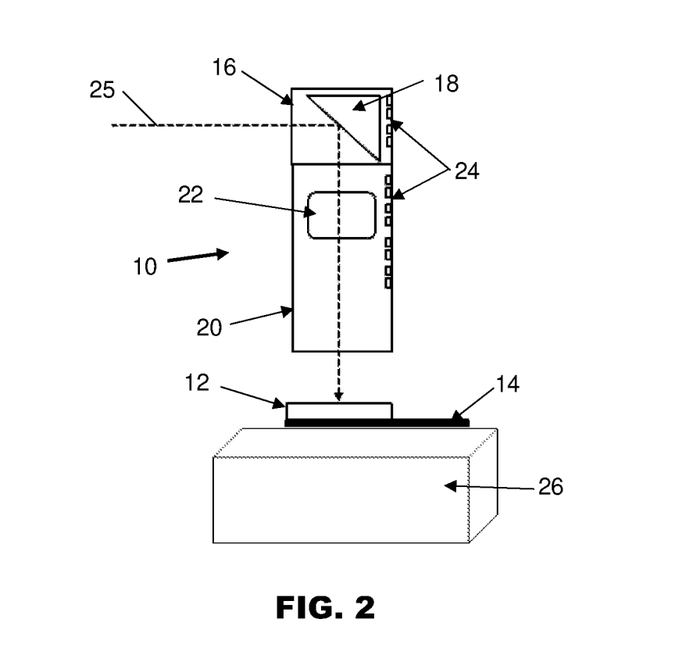
FIG. 2 is a side view of the set-up in FIG. 1, wherein a light path is illustrated showing an ideal perpendicularity alignment between the OIS module and the image sensor.

FIG. 2 is a side view of the set-up in FIG. 1, wherein a light path 25 is illustrated showing an ideal perpendicularity alignment between the OIS module 16 and the image sensor 12. With the folded camera arrangement, an incident light enters one side of the OIS module 16 along a first optical path, and the light path 25 is reflected by a reflective surface of the OIS lens element 18 by 90 degrees to project the incident light along a second optical that is perpendicular to the first optical path. The light path 25 then passes through the tele-lens element 22 (which may be operative to produce an optical zoom) along the second optical path, before the projected light is received by the image sensor 12. In the ideal alignment, the light path 25 will be incident on the image sensor 12 normally, or at an angle of 90 degrees, with respect to an image plane of the image sensor 12. Correspondingly, at this ideal alignment, the reflective surface forms an inclination angle of 45 degrees with respect to the incident light.

Any horizontal or vertical shifts, or any rotation of the OIS lens element 18 when reflecting the light path 25 will result in an undesirable translation or shift of a final projected image away from a center of the image sensor 12. In such cases, it becomes uncertain whether a center projection line of a test chart is being correctly projected onto the center of the image sensor 12. Moreover, although the effect of lens tilt has been neglected in the above analysis, tilting of the tele-lens element 22 relative to the tele-lens module 20 may also occur in practice, which causes deviation of the light path 25.

In some extreme cases, due to the limited tilting travel range of the OIS lens element 18, it may not be possible to completely correct or compensate for an initial tilt error in the OIS lens element 18 by just using a built-in OIS motor (not shown) for tilting the OIS lens element 18 to its limits. For example, the OIS lens element 18 may not be movable to a target tilt angle for correcting the said initial tilt error due to the target tilt angle being out of its mechanical travel range. Thus, the OIS lens element 18 may not be able to incline exactly at a 45-degree angle with respect to the reference plane of a test chart for performing AA, and the final AA results may be significantly impacted as the test chart will be incorrectly tilted when the OIS lens element 18 is also not tilted correctly.

Figure 3:
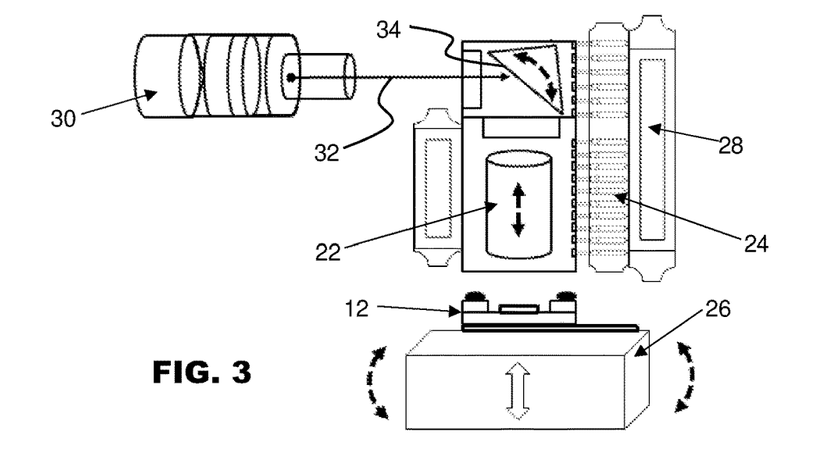
FIG. 3 is a side view of a distance inspection device for measuring an orientation of an OIS lens element relative to the image sensor in respect of the first mode of assembling the camera module.

FIG. 3 is a side view of a distance inspection device for measuring an orientation of an OIS lens element 18 relative to the image sensor 12 in respect of the first mode of assembling the camera module, wherein the OIS lens module 16 is already fixed to the tele-lens module 20 at the time the OIS lens module 16 and the OIS lens element 18 are being aligned relative to the image sensor 12. The distance inspection device 30 may be used to measure a distance from the distance inspection device 30 to a point on the OIS lens element 18, and in this embodiment, the distance inspection device 30 comprises a laser distance sensor 30. The laser distance sensor 30 produces a laser beam 32 which is directed at a point on a reflective surface 34 of the OIS lens element 18.

Figure 4:
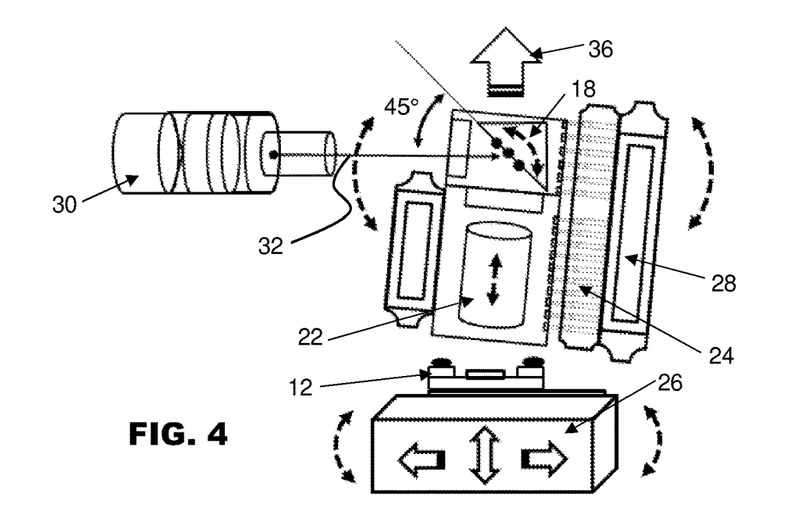
FIG. 4 illustrates the measurement of a tilting angle of a reflective surface of the OIS lens element.

FIG. 4 illustrates the measurement of a tilting or inclination angle of the reflective surface 34 of the OIS lens element 18 with respect to an incident light emanating from the laser distance sensor 30. As the laser distance sensor 30 is capable of measuring a distance from the laser distance sensor 30 to a single point along a path travelled by the laser beam 32, using this approach, the laser distance sensor 30 and the OIS module 16 may be moved relative to each other in order to measure distances between multiple inspection points on the reflective surface 34 and the laser distance sensor 30. Thus, the OIS module 16 may be moved upwards 36 in a direction which is transverse to the direction of the incident laser beam 32 relative to the laser distance sensor 30, so that multiple inspection points on the reflective surface 34 may be measured, such as three inspection points.

Figure 5:
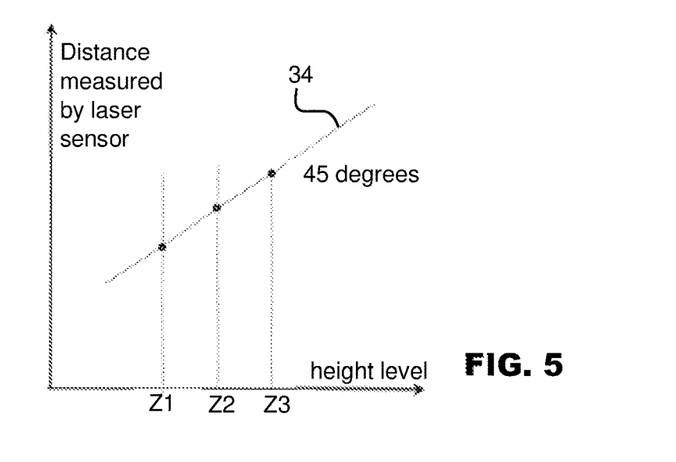
FIG. 5 is a graph showing an exemplary titling profile of the reflective surface.

The inclination angle of the reflective surface 34 of the OIS lens element 18 can then be determined by plotting the measured distances at those inspection points that are at known heights by calculating a slope of an interpolated line corresponding to those inspection points. FIG. 5 is a graph showing an exemplary titling profile of the reflective surface 34. In this case, the slope 34 of the graph indicates that the tilting angle of the reflective surface 34 is at 45 degrees relative to the laser beam 32. As this is an ideal angle for a light path 25 to be normally incident on the image sensor 12 perpendicularly, no further adjustment of the combined lens module 10 is necessary.

It should be highlighted that, at this time, the combined lens module 10 is gripped by a lens module holder 28, and the image sensor 12 is affixed onto an image sensor holder 26. The image sensor holder 26 may be an SUT sensor-moving table. Each of the lens module holder 28 and the image sensor holder 26 is capable of adjusting the combined lens module 10 and the image sensor 12 respectively in six degrees of freedom. Thus, the combination of adjustments made by the lens module holder 28 and the image sensor holder 26 effectively allows the combined lens module 10 to be adjusted relative to the image sensor 12 in twelve degrees of freedom. In certain situations, the slope of the reflective surface 34 cannot be adjusted to a tilting or inclination angle of 45 degrees solely by electrically driving and manipulating the OIS lens element 18 using electrical signals transmitted by the pogo pin connectors 24 to drive the OIS lens element 18 to move to the said angle. In such situations, the lens module holder 28 and/or the image sensor holder 26 may further adjust the combined lens module 10 and the image sensor 12 relative to each other in order to achieve a tilting angle of 45 degrees for the reflective surface 34 of the OIS lens element 18 relative to the image plane of the image sensor 12. For instance, in FIG. 4, the combined lens module 10 is illustrated as being tilted relative to the image plane of the image sensor 12, in order to arrive at a tilting angle of 45 degrees for the reflective surface 34.

If any inclination angle error in the OIS lens element 18 needs to be adjusted by tilting the combined lens module 10, the lens module holder 28 may apply an X-Y tilt on the combined lens module 10 in order to correct an inclination angle error of the OIS lens element 18. In such cases, the correction angle which is externally applied to the combined lens module 10 should be recorded, as a housing bracket for the combined lens module 10 may no longer be kept at the same targeted position with respect to a reference mechanical feature or surface of the combined lens module 10.

A recorded value of such external tilt compensation for each combined lens module 10 should be catered for accordingly during the assembly of the folded camera module into the final mobile phone or other product. This can be done by adding a suitable spacer in order to restore the folded camera module to its ideal installation position.

Figure 6:
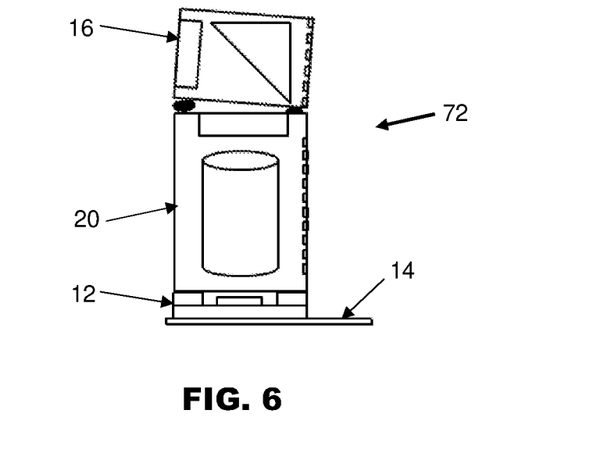
FIG. 6 is an illustration of an assembled camera module.

FIG. 6 is an illustration of an assembled camera module 72, which comprises the image sensor 12 and the OIS module 16, which are attached to opposite sides of the tele-lens module 20. In order to ensure the perpendicularity of a projected image received by the image sensor 12, the OIS module 16 may be tilted with respect to the tele-lens module 20. Such an assembled camera module 72 can be assembled by adopting a second mode of assembly of camera modules as described below.

Figure 7:
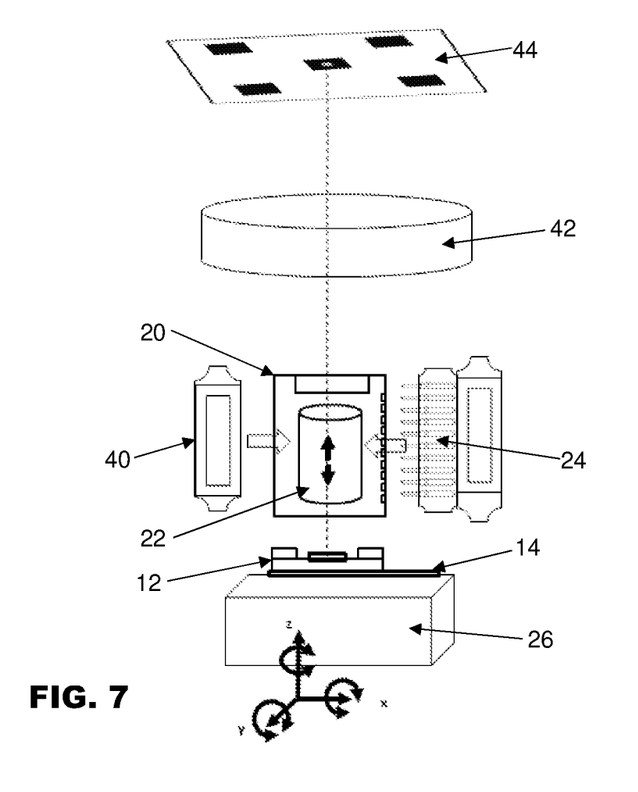
FIG. 7 is a side view of a second mode of assembling a camera module where the tele-lens module is first attached to the image sensor prior to integrating the OIS module.

FIG. 7 is a side view of a second mode of assembling a camera module where a tele-lens module 20 is first attached to the image sensor 12, so that the tele-lens module 20 is fixed with respect to the image sensor 12 prior to integrating the OIS module 16 by fixing the OIS module 16 to the tele-lens module 20. In this second mode, the tele-lens module 20 is held by a tele-lens module holder 40 and is first aligned relative to the image sensor 12 that is affixed to the image sensor holder 16. To conduct such alignment, the image sensor 12 is arranged to view a test chart 44 through the tele-lens module 20 and a relay lens system 42. A pogo pin connector 24 that is electrically connected to the tele-lens module 20 while the tele-lens module 20 is being held provides electrical signals to drive and move the motorized tele-lens element 22 where necessary, when the image sensor 12 is viewing the test chart 44. In the absence of the OIS module 16, an optical path between the image sensor 12 and the test chart 44 does not pass through the OIS module 16 when conducting this alignment. After the tele-lens module 20 has been correctly aligned relative to the image sensor 12, the tele-lens module 20 is attached to the image sensor 12.

Figure 8:
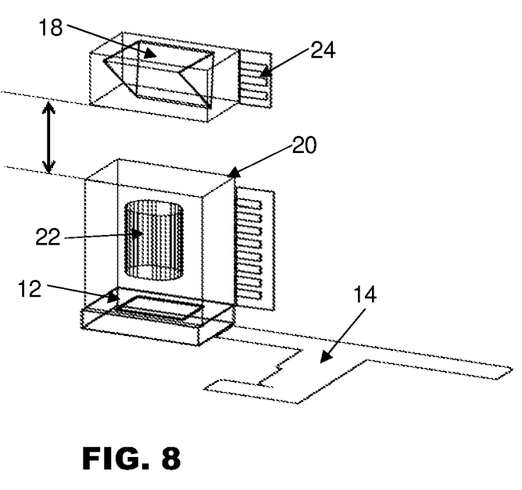
FIG. 8 is an isometric view of an OIS module that is about to be attached to the tele-lens module which has been attached to the image sensor.

FIG. 8 is an isometric view of an OIS module 16 that is about to be attached to the tele-lens module 20 which has been integrated with the image sensor 12. In general, prior to attaching the OIS module 16 to the tele-lens module 20, they have to be aligned relative to each other. During such alignment, the pogo pin connector 24 is electrically connected to the OIS module 16 for manipulating the OIS lens element 18.

Figure 9:
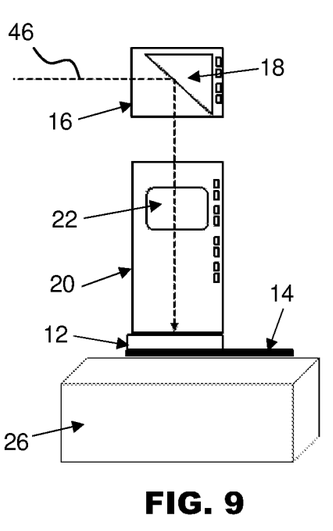
FIG. 9 is a side view of the set-up in FIG. 8, wherein a light path is illustrated showing an ideal perpendicularity alignment between the OIS module and the image sensor.

FIG. 9 is a side view of the set-up in FIG. 8, wherein a light path 46 is illustrated showing an ideal perpendicularity alignment between the OIS module 16 and the image sensor 12. A test chart image would be transmitted along the light path 46 during AA, and the light path should ideally be incident perpendicularly on the image plane of the image sensor 12 before the OIS module 16 is attached to the tele-lens module 20.

Figure 10:
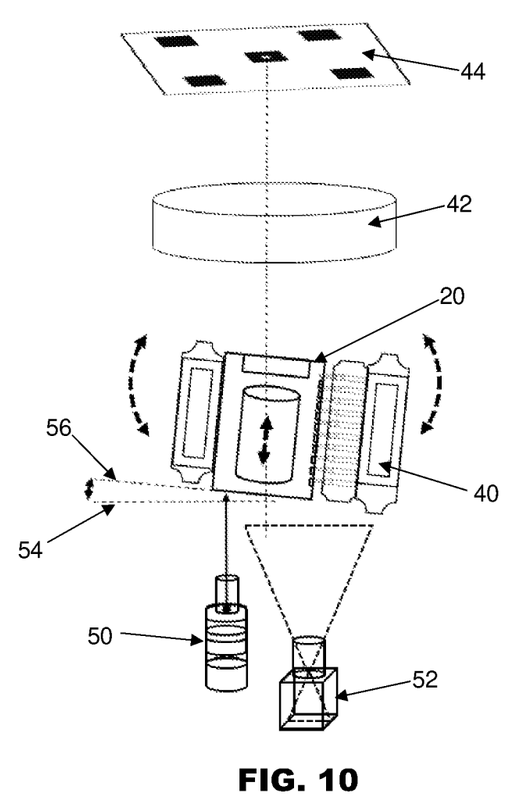
FIG. 10 is a side view of a feature inspection device for measuring an orientation of the tele-lens module in respect of the second mode of assembling the camera module.

FIG. 10 is a side view of a feature inspection device for measuring an orientation of the tele-lens module 20 in respect of the second mode of assembling the camera module, which is conducted prior to alignment of the tele-lens module 20 relative to the image sensor 12. In this approach, the feature inspection device may comprise a laser distance sensor 50, as well as an up-looking inspection camera 52, for pre-aligning the tele-lens module 20 that has been clamped by or loaded onto a tele-lens module holder 40, before conducting an AA process with reference to a relay lens system 42 and a test chart 44. In this tele-lens pre-alignment process the tele-lens module holder 40 is operative to adjust the tele-lens module 20 in six degrees of freedom in order to ensure that the tele-lens module 20 is exactly vertical.

After the tele-lens module 20 has been clamped by or loaded onto the tele-lens module holder 40, by measuring the actual distances of at least three points on a mechanical reference feature (such as the bottom surface) of the tele-lens module 20, an X-Y tilting-error on the tele-lens module 20 can be calculated. Furthermore, through inspection by the up-looking inspection camera 52, any rotation or orientation error of the tele-lens module 20 on the tele-lens module holder 40 can also be checked and adjusted. By measuring the distances of multiple points to the laser distance sensor 50, a mechanical reference plane 56 can be calculated, and this is compared to a system reference surface 54, which is a plane onto which the mechanical reference plane 56 should be aligned.

The measured variation in X-Y tilting and rotation/orientation error of the tele-lens module 20 can then be corrected by applying an external compensation adjustment to the tele-lens module 20 through manipulation by the tele-lens module holder 40.

After the aforesaid pre-alignment checking process on the tele-lens module 20 while it is being clamped by the tele-lens module holder 40, the image sensor holder 26 can be used to conduct an AA process.

Figure 11:
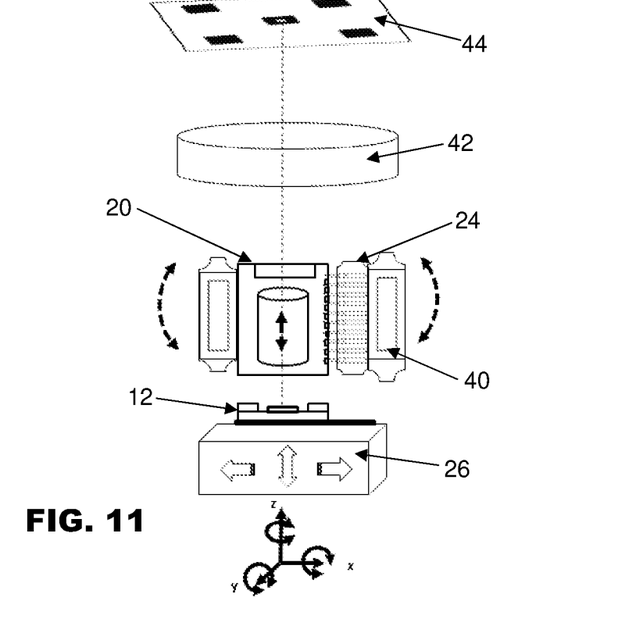
FIG. 11 shows the image sensor being moved under the tele-lens module before being attached to the tele-lens module.

FIG. 11 shows the image sensor 12 being moved under the tele-lens module 20 before being attached to the tele-lens module 20. A height and rotation angle or orientation of the tele-lens module 20 should be correctly orientated with respect to a reference angle or edge on a test chart. By keeping the tele-lens module 20 at its pre-alignment position or orientation as described above, the image sensor 12 would be able to correctly collect response curves from Z-scanning of the test chart 44 to obtain image quality indices (e.g. SFR/MTF) of various regions of interests on the test chart 44 at different heights of the image sensor 12 by moving the image sensor holder 26 relative to the tele-lens module 20. A relative tilt between the tele-lens module 20 and the image sensor 12 which needs to be corrected can then be determined from peak values of the image quality indices that are obtained at certain heights where four corner regions of interest on the test chart 44 are located. The image sensor 12 and tele-lens module 20 are attached to each other after correcting for any tilting errors relative to the image plane of the image sensor 12. The tele-lens module holder 40 will in essence adjust a tilting angle of the tele-lens module 20 to align the mechanical reference plane 56 with the system reference surface 54. After such alignment, the image sensor 12 can be attached to the tele-lens module 20 in its aligned orientation.

During the aforesaid process, an auto-focus function of the tele-lens module 20 should be powered on by using the pogo pin connector 24 installed on the tele-lens module holder 40, and the tele-lens element 22 should be moved to a certain target position for focusing at an object at infinity during the aforesaid process.

Figure 12:
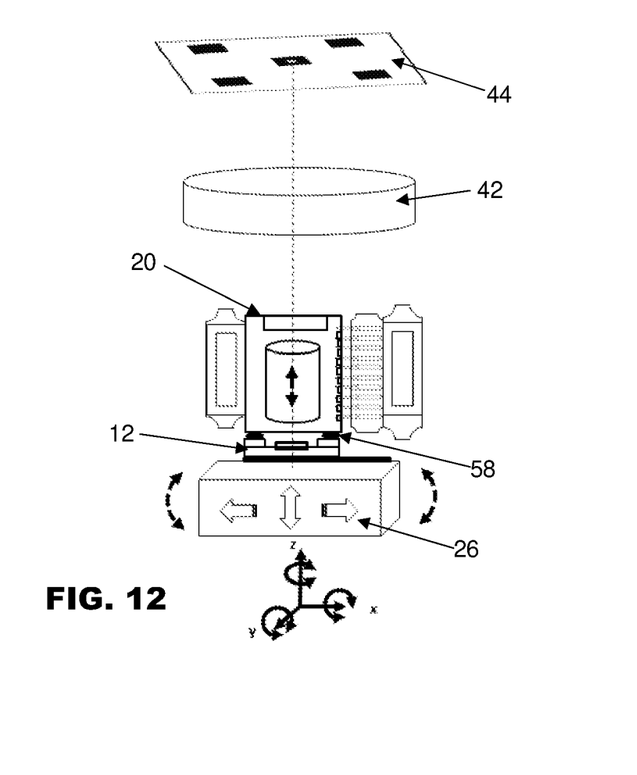
FIG. 12 shows the image sensor having been attached to the tele-lens module using glue.

FIG. 12 shows the image sensor 12 having been attached to the tele-lens module 20 using glue 58. The glue 58 may be an ultraviolet ("UV") glue. When using UV glue to fix the OIS module 16 at its optimized location and orientation, the OIS module 16 is attached to the top surface of the tele-lens module 20 by shining UV LED light to cure the UV glue which has been dispensed so as to lock the OIS module 16 in position.

Figure 13:
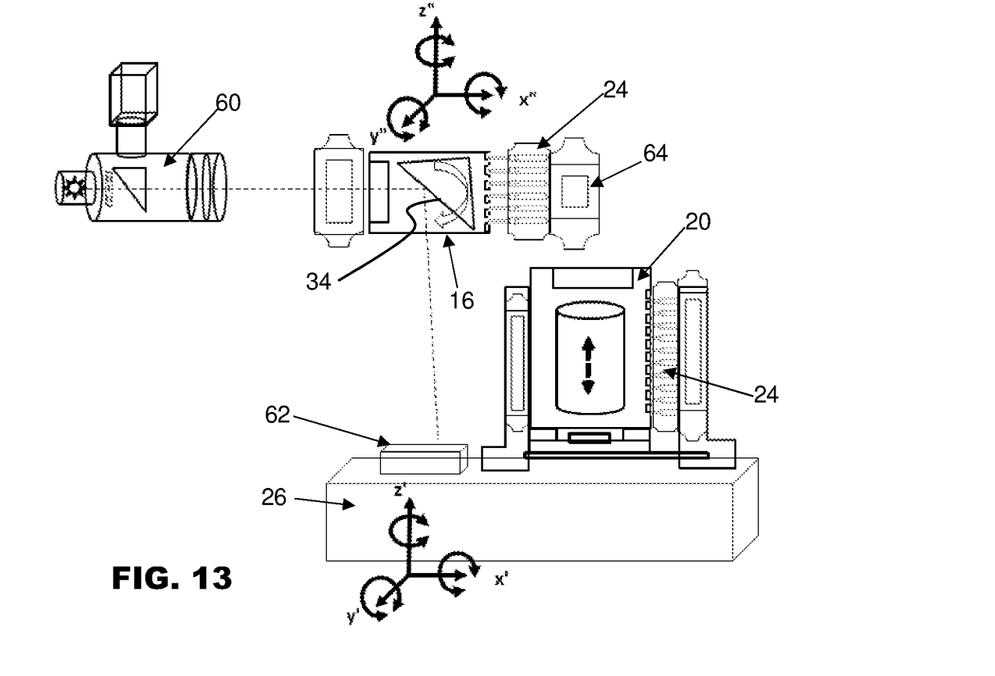
FIG. 13 is a side view of a collimator device used for adjusting a tilting angle of the reflective surface of the OIS lens element.

After attaching the tele-lens module 20 to the image sensor 12, the OIS module 16 will then have to be attached onto the tele-lens module 20 to form an assembled folded camera module. It would be necessary to align an internal reflective surface 34 of the OIS lens element 18 to make sure that it is indeed inclined at a 45-degree angle with respect to a plane of a reference test chart. FIG. 13 is a side view of a collimator device 60 for detecting a tilting or inclination angle of the reflective surface 34 of the OIS lens element 18. Further, a reference mirror 62 is also located on the image sensor holder 26 to reflect a light beam generated from the collimator device 60.

The OIS module 16 is held by the OIS module holder 64 and is located over the reference mirror 62. A pogo pin connector 24 integrated to the OIS module holder 64 is electrically connected to the OIS module 16 to provide electrical signals to the motorized OIS lens element 18 so as to electrically manipulate the OIS lens element 18. In order to ensure that the OIS lens element 18 is making a 45-degree inclination angle relative to the test-chart's reference plane, the collimator device 60 generates a light beam which enters the OIS module 16 along a first optical path, and the light beam is reflected by the OIS lens element 18 along a second optical path towards the reference mirror 62, which is positioned along the second optical path. The reference mirror reflects the light beam back towards the OIS lens element 18, which further transmits the light beam back to an integrated camera unit inside the collimator device 60.

The collimator device 60 is mounted horizontally and its integrated camera unit is arranged to receive a parallel light beam reflected back from the reference mirror 62 after passing through the OIS module 16. If the OIS lens element 18 is forming a 45-degree angle with respect to a reference plane of the collimator device 60, then the light beam can be reflected downward to the reference mirror on the image sensor holder 26.

If the light beam is not detected, the OIS module 16 would be further adjusted by manipulating the OIS lens element 18, and if necessary, by tilting the OIS module 16 with the OIS module holder 64 until the light beam is normally incident onto the reference mirror 62, and the reflected light beam is able to be received by the integrated camera unit inside the collimator device 60. Thus, by checking an extent of a positional shift of the reflected image on the collimator device 60, it is possible to calculate a tilt error of the OIS lens element 18. The tilt error can be corrected or compensated by applying a suitable tilting motion on an OIS module holder 64. The OIS lens element 18 will have to be powered on (e.g. it should be moved by the OIS motor back to its home position) for achieving a 45-degree inclination angle of the OIS lens element 18. The OIS lens element 18 should also be moved to its initial home position before calculating the tilt-error detected by the collimator device 60, and corrective action is taken on the OIS lens element 18, so that this position can be recalled and the OIS lens element 18 may be moved back to this pre-aligned position in case it is needed later.

Figure 14:
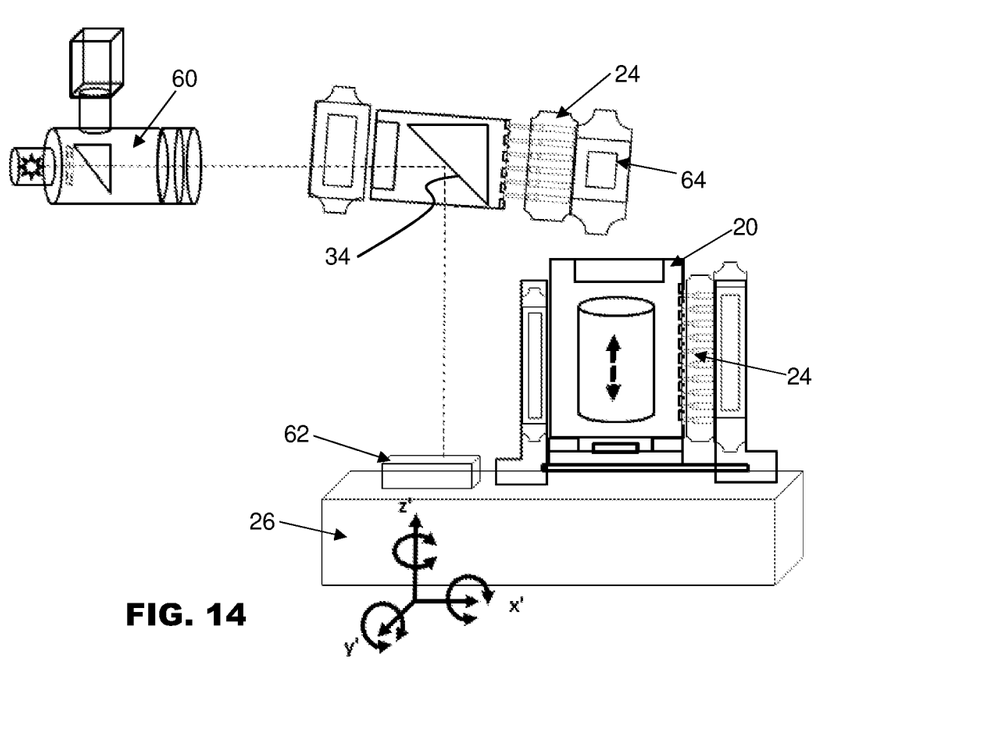
FIG. 14 is a side view of the OIS module being tilted to achieve perpendicularity of a light beam with respect to a reference mirror.

FIG. 14 is a side view of the OIS module 16 being tilted to achieve perpendicularity of a light beam with respect to a reference mirror 62. It can be seen that both the OIS lens element 18 and the OIS module 16 have been tilted with respect to the reference mirror 62, in order to ensure that the light beam from the collimator device 60 falls perpendicularly onto the reference mirror 62.

Figure 15:
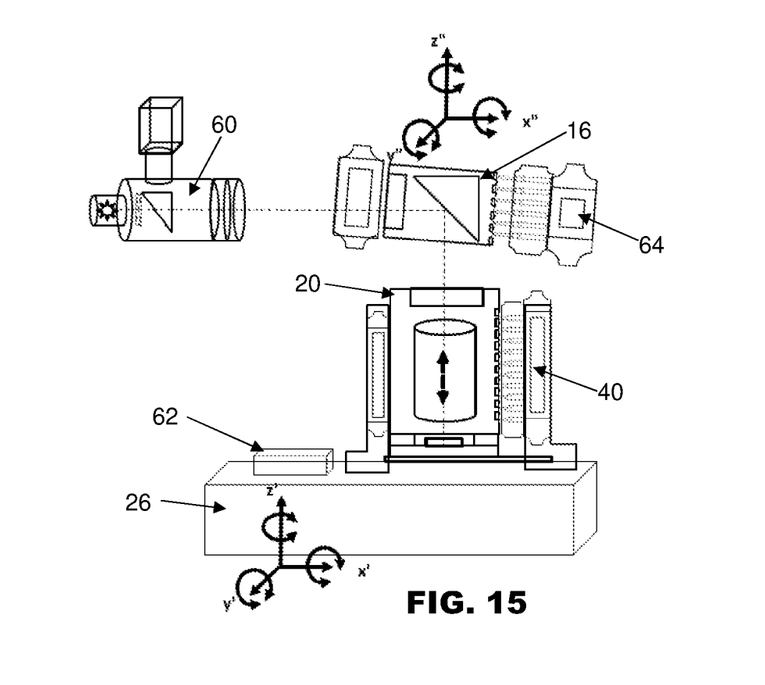
FIG. 15 is a side view of an adjusted OIS module being moved to a position over the tele-lens module.

FIG. 15 is a side view of an adjusted OIS module 16 held by the OIS module holder 64 being moved to a position over the tele-lens module 20. In this position adjacent to the tele-lens module 20, the OIS lens element 18 directs the light beam generated by the collimator device 60 from the first optical path onto the second optical path towards the image sensor 12, so that the image sensor 12 may directly view the light beam. The tilting angle of the OIS lens element 18 and the OIS module 16 will be further adjusted, if necessary, until the light beam is projected centrally onto the image sensor 12.

Figure 16:
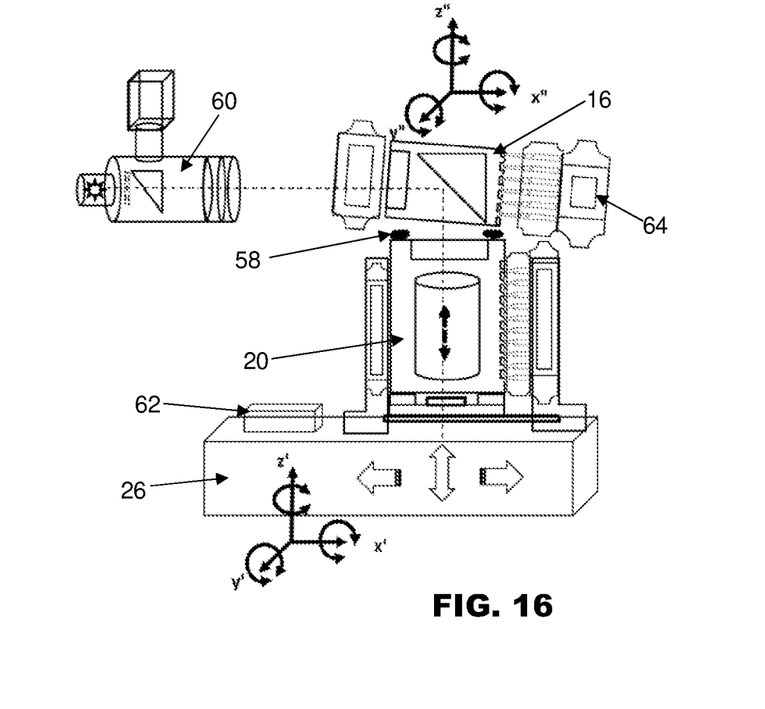
FIG. 16 is a side view of the OIS module that is attached to the image sensor.

FIG. 16 is a side view of the OIS module 16 that is attached to the image sensor 12 after ensuring that the light beam is received centrally on the image sensor 12. It can be seen that the OIS module 16 is deliberately tilted relative to the tele-lens module 20, for ensuring that the light beam is centrally received on the image sensor 12.

The OIS module 16 may be attached to the tele-lens module 20 when the OIS lens element 18 is positioned at its home tilt angle, while the auto-focus function of the tele-lens element 20 is enabled and is moved to a position for focusing at an object at infinity when the second optical path is directed through the tele-lens module 20.

After determining the inclination angle of the OIS lens element 18, the OIS module 16 may be attached while at its corrected position with respect to the tele-lens module 20 which is now coupled to the image sensor holder 26. The tele-lens module 20 should be clamped while it is electrically connected to the pogo pin connector 24 such that the auto-focus function of the tele-lens element is powered on during the attachment of the OIS module 16 to a top surface of the tele-lens module 20. By checking the projected image that is received by the image sensor 12, it can be ensured that the light beam projected from the collimator device 60 (which is at infinity) can be focused correctly on a center position of the image sensor 12. The OIS module 16 and the tele-lens module 20 are attached together by applying glue 58 to lock the OIS module 16 at its optimal location for viewing images.

By using the above method to attach the OIS module 16 to the tele-lens module 20, the collimator device 60 can be further used to check a viewing direction of the OIS lens element 18 before the OIS module 16 is attached. If the OIS lens element 18 is not making a 45-degree angle with respect to the reference light beam from the collimator device 60, then the OIS module holder 64 may manipulate the OIS module 16 to correct a calculated tilt error in the OIS module 16.

By checking a projected image received on the image sensor 12, it is possible to optimize the exact position of the OIS module 16 relative to a top surface of the tele-lens module 20 before the glue 58 is used to fix or lock the position of the OIS module 16 in the best viewing direction or position.

Figure 17:
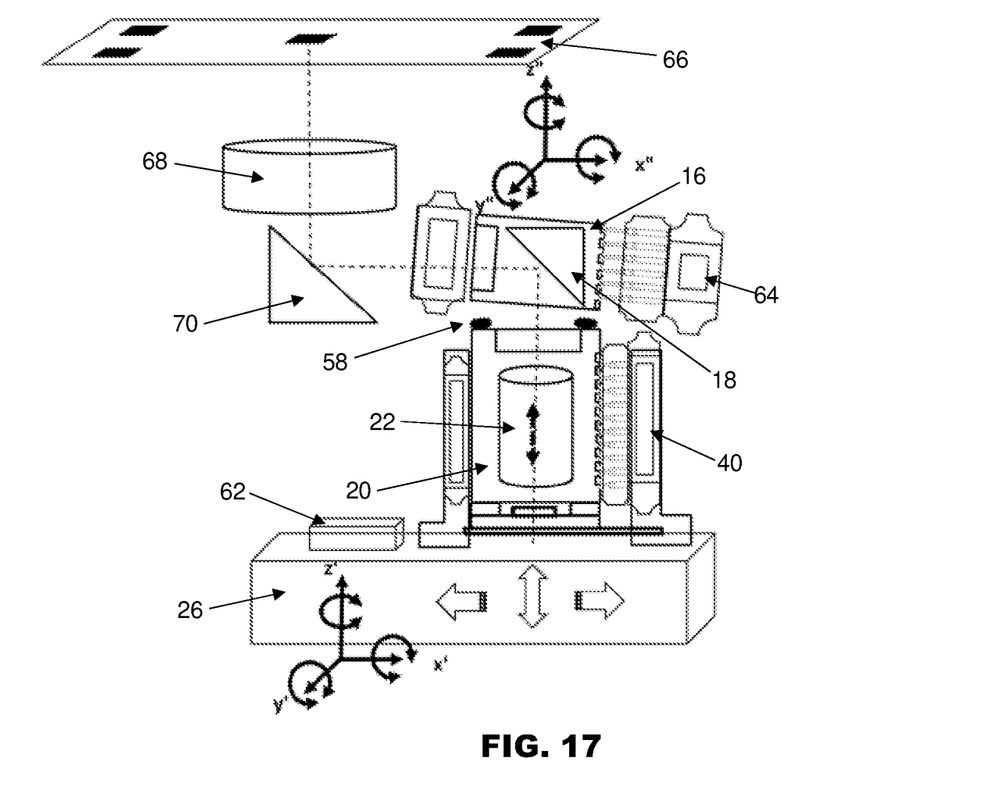
FIG. 17 is a side view of an alternative method for aligning the OIS module with respect to the image sensor using a test chart.

FIG. 17 is a side view of an alternative method for aligning the OIS module 16 with respect to the image sensor 12 using a test chart 66. Instead of utilizing a collimator device 60 for aligning the OIS module 16, an image of the test chart 66 is passed through a relay lens system 68 and is then reflected by a prism 70, before being directed into the OIS module 16 towards the image sensor 12. The image sensor 12 views the test chart 66 while the OIS module 16 is manipulated until the best image of the test chart 66 is obtained. Similarly, the OIS module 16 may be manipulated by tilting the OIS lens element 18 as well as using the OIS module holder 64 to tilt the whole OIS module 16 until the best image of the test chart 66 is obtained.

The OIS module 16 should be pre-aligned by using the same procedures that have been described with reference to FIG. 14, that is, by using the collimator device 60 to first check that the OIS lens element 18 is correctly forming an inclination angle of 45 degrees with respect to a reference horizontal plane of the test chart 66. A bonding position of the image sensor 12 and the OIS module 16 should then be calibrated with respect to the test chart 66 and the relay lens system 68. For example, before attaching the OIS module 16 to the tele-lens module 20, an image plane of the image sensor 12 should be aligned correctly with the reference plane of the test chart 66 and relay lens system 68 in order to provide an optimal viewing angle and image plane in the final assembled folded camera device. The aforesaid approach ensures that a center of the image of the test chart 66 is projected correctly onto the center of the image sensor 12 after the OIS module 16 attachment process.

Once the OIS module 16 has been aligned, glue 58 is dispensed onto the tele-lens module 20, and the OIS module 16 is then attached to the tele-lens module 20.

Using the approaches disclosed in relation to the preferred embodiments of the invention, it is possible to make use of an AA system together with additional detection or inspection devices to compensate for and/or correct an initial tilt error of an OIS module 16 inside a folded camera module.

An advantage of the preferred embodiments of the present invention as described above is that the OIS lens element 18 can be pre-aligned to make sure that it is forming an angle of exactly 45 degrees with respect to a reference plane of the AA system, or in other words, a plane of the test chart or an image plane of the image sensor. As such, the AA system would be able to achieve the best final production yield with a superior final image quality.

Although the present invention has been described in considerable detail with reference to certain embodiments, other embodiments are possible.

Therefore, the spirit and scope of the appended claims should not be limited to the description of the embodiments contained herein.

The invention claimed is:

1. Method for aligning first and second lens modules relative to an image sensor before fixing the first and second lens modules to the image sensor to form an assembled camera module, the method comprising the steps of:

holding the first lens module while providing electrical signals to a motorized first lens element comprised in the first lens module, the electrical signals being operative to drive the first lens element to move;

receiving an incident light along a first optical path with a reflective surface of the first lens element and projecting the incident light along a second optical path perpendicular to the first optical path;

projecting the incident light through the second lens module along the second optical path onto the image sensor; and moving the first lens module and first lens element relative to the image sensor until the reflective surface forms an inclination angle of 45 degrees with respect to the incident light, so that the incident light is projected normally onto an image plane of the image sensor.

2. Method as claimed in claim 1, wherein when moving the first lens module and the first lens element relative to the image sensor, the first lens module is already fixed to the second lens module.

3. Method as claimed in claim 2, further comprising the step of measuring the inclination angle of the reflective surface with respect to the incident light with a distance inspection device.

4. Method as claimed in claim 3, wherein the distance inspection device comprises a distance sensor for measuring distances between multiple points on the reflective surface and the distance sensor, so as to measure the inclination angle of the reflective surface.

5. Method as claimed in claim 4, further comprising the step of moving the first lens module relative to the distance sensor in a direction which is transverse to a direction of the incident light when measuring the distances of the multiple points on the reflective surface and the distance sensor.

6. Method as claimed in claim 1, wherein the second lens module is fixed with respect to the image sensor prior to fixing the first lens module to the second lens module.

7. Method as claimed in claim 6, wherein prior to fixing the second lens module with respect to the image sensor, aligning the second lens module relative to the image sensor by viewing a test chart with the image sensor through the second lens module via an optical path which does not pass through the first lens module.

8. Method as claimed in claim 7, further comprising the step of holding the second lens module while providing electrical signals to the second lens module for driving a motorized second lens element that is comprised in the second lens module to move.

9. Method as claimed in claim 8, wherein the second lens module is held by a second lens module holder, and the second lens module holder is operative to adjust the second lens module relative to the image sensor in six degrees of freedom.

10. Method as claimed in claim 7, wherein prior to viewing the test chart with the image sensor, inspecting a mechanical reference feature on the second lens module with a feature inspection device and using the said mechanical reference feature for adjusting the second lens module so that it is exactly vertical.

11. Method as claimed in claim 6, wherein prior to attaching the first lens module to the second lens module, ensuring that the reflective surface is inclined at 45 degrees with respect to the incident light by:

directing a light beam from a collimator device along the first optical path;

positioning a reference mirror along the second optical path to reflect the light beam back towards the collimator device; and moving and adjusting the first lens module and the first lens element until the reflected light beam is received by an integrated camera unit in the collimator device.

12. Method as claimed in claim 11, further comprising the steps of:

moving the first lens module adjacent to the second lens module; and directing the light beam with the first lens element along the second optical path through the second lens module for projecting the light beam onto the image sensor.

13. Method as claimed in claim 12, further comprising the step of adjusting the first lens module and the first lens element relative to the image sensor until the light beam is projected centrally onto the image sensor.

14. Method as claimed in claim 13, wherein when the second optical path is directed through the second lens module, an auto-focus function of a motorized second lens element comprised in the second lens module is enabled and is moved to a position for focusing at an object at infinity.

15. Method as claimed in claim 11, further comprising the steps of:

moving the first lens module adjacent to the second lens module;

directing an image of a test chart through the second lens module onto the image sensor; and adjusting the first lens module and the first lens element relative to the image sensor until the image of the test chart is projected centrally onto the image sensor.

16. Method as claimed in claim 15, further comprising the step of fixing the first lens module to the second lens module after an image plane of the image sensor has been verified to be aligned with a reference plane of the test chart.

17. Method as claimed in claim 1, wherein the electrical signals are provided to the first lens element by way of a pogo pin connector that is connected to the first lens module, the pogo pin connector being integrated to a first lens module holder for holding the first lens module.

18. Method as claimed in claim 1, wherein the first lens module comprises an optical image stabilizer module and second lens module comprises a telecentric lens module.

19. Method as claimed in claim 1, wherein the first lens module is held on a first lens module holder and the image sensor is held on an image sensor holder, and each holder is operative to adjust the first lens module and the image sensor respectively in six degrees of freedom.

20. Method as claimed in claim 19, wherein the holders are operative to further adjust the first lens module and/or the image sensor relative to each other in order to orientate the inclination angle of the reflective surface to 45 degrees with respect to the incident light, if the inclination angle of the reflective surface cannot be adjusted to the said angle solely by electrically driving the first lens element to move.

* * * * *